(12) United States Patent
Jagad et al.

(10) Patent No.: US 9,906,582 B2
(45) Date of Patent: Feb. 27, 2018

(54) CONTENT SNIP CAPTURE AND SHARING

(71) Applicant: AirWatch LLC, Atlanta, GA (US)

(72) Inventors: Pratik Jagad, Marietta, GA (US); Avanti Kenjalkar, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 244 days.

(21) Appl. No.: 14/740,965

(22) Filed: Jun. 16, 2015

(65) Prior Publication Data

US 2016/0373515 A1 Dec. 22, 2016

(51) Int. Cl.
*G06F 15/16* (2006.01)
*H04L 29/08* (2006.01)
*H04N 21/858* (2011.01)

(52) U.S. Cl.
CPC ......... *H04L 67/06* (2013.01); *H04N 21/8586* (2013.01); *G06F 2221/2137* (2013.01)

(58) Field of Classification Search
CPC ........ H04N 21/8586; G06F 2221/2137; H04L 67/06
See application file for complete search history.

(56) References Cited

U.S. PATENT DOCUMENTS

| | | | | |
|---|---|---|---|---|
| 8,200,761 B1* | 6/2012 | Tevanian | ................ | H04L 51/12 709/206 |
| 2006/0059416 A1* | 3/2006 | Lin | ........................ | G06F 17/289 715/208 |
| 2006/0072827 A1* | 4/2006 | Nagamatsu | ........ | G06K 9/00711 382/190 |
| 2008/0065982 A1* | 3/2008 | Evanchik | .............. | G06F 3/0483 715/255 |
| 2008/0288453 A1* | 11/2008 | Smetters | ........... | G06F 17/30442 |
| 2011/0176788 A1* | 7/2011 | Bliss | .................... | G11B 27/105 386/241 |
| 2017/0011051 A1* | 1/2017 | Specht | .............. | G06F 17/30073 |

* cited by examiner

*Primary Examiner* — Mohamed Wasel
(74) *Attorney, Agent, or Firm* — Thomas | Horstemeyer, LLP; Arvind R. Reddy; Jason M. Perilla

(57) ABSTRACT

To share snips of content, an identifier of a recipient for a link to a content file is received. With reference to content access rules for the recipient, content access metadata of the content file is parsed to identify a range of the content file accessible to the recipient. In a user interface, an indicator of the range of the content file is presented. A user can identify a selection of a snip of the content file accessible to the recipient in the user interface. Once the selection is identified, the link to the content file can be generated and forwarded to the recipient. The link can include an argument that identifies a start and an end of the snip of the content file. The link can also include other arguments, such as copy snip, access rule, or expiration arguments.

20 Claims, 6 Drawing Sheets

CONTENT SNIP CAPTURE AND SHARING

BACKGROUND

Today, electronic document, image, media, and other types of data files can be easily distributed over computer networks and viewed on display screens of various computing platforms at nearly any geographic location. For example, data files, including video, audio, and other types of media segments can be stored and transferred among computing devices coupled through computer networks. The flexibility and ease with which data files can be transferred using computer networks has resulted in the generation, transfer, and storage of large amounts of data.

The flexibility and ease with which data files can be transferred has also resulted in a larger amount of collaboration between individuals using computing devices and computer networks. For example, a user of one computing device can transfer an electronic document to an intended recipient by attaching the electronic document to an e-mail addressed to the recipient, with the body of the e-mail including various comments or instructions for consideration. As another example, a user can transfer a media file to an intended recipient through an e-mail, with the body of the e-mail identifying a range of the media file to review. With the flexibility and ease with which data files can be transferred, however, concerns regarding data privacy, integrity, and security also arise.

For the recipient, it is generally necessary to open the data file, read any associated comments or instructions, identify the portion of the data file referenced in the comments, and perform any tasks associated with the portion of the data file. It that context, it can be relatively cumbersome for the recipient to work separately with the data file and the comments. It can also be time consuming for the recipient to find the relevant portion of the data file before performing any tasks.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As noted above, the flexibility and ease with which data files can be transferred between computing devices has resulted in a significant amount of data file transfer. However, concerns regarding data privacy, integrity, and security also arise with the ease with which data files can be transferred. Additionally, in many circumstances, it is not necessary for individuals to transfer entire data files among each other. Especially for a large data file, such as some video or audio files, it would be suitable in many cases to transfer only a relevant portion of the data file. The transfer of only the relevant portion would save data storage costs for the recipient, while also making it easier for the recipient to identify the relevant portion.

In the context outlined above, the concepts of content snip capture and sharing are described herein. Using content snip capture and sharing, a link to one or more portions or snips of a content file can be generated and forwarded to a recipient rather than transferring the entire content file. Arguments embedded in the link can direct the recipient to one or more portions or snips of the content file, saving the recipient time. The arguments can also specify whether to copy the snips, provide an additional layer of access rules for the snips, or specify a time for expiration for the link.

Among the more detailed examples provided below, to achieve content snip capture and sharing, a content snipper interface can be used to identify a recipient for a link to a content file. The content file can be associated with certain content access rules for the recipient. The content access rules can be defined in content access metadata for the content file to provide security and access control in a computing network. To enforce the content access rules for the recipient, a snip engine can parse the content access metadata of the content file to identify a range of the content file accessible to the recipient. An interface generator can present an indicator of the range of the content file accessible to the recipient in a user interface. A user can select a snip of the content file accessible to the recipient in the user interface. Once the selection is identified, the snip engine can generate the link to the content file and forward the link to the recipient. As noted above, based on various options for link generation, the link can include an argument that specifies a start and an end of the snip of the content file. The link can also include other arguments, such as copy snip, display annotations, access rule, or expiration arguments.

Turning to the drawings, the following paragraphs provide a general description of a representative system and its components followed by a discussion of the operation of the same.

Figure 1:
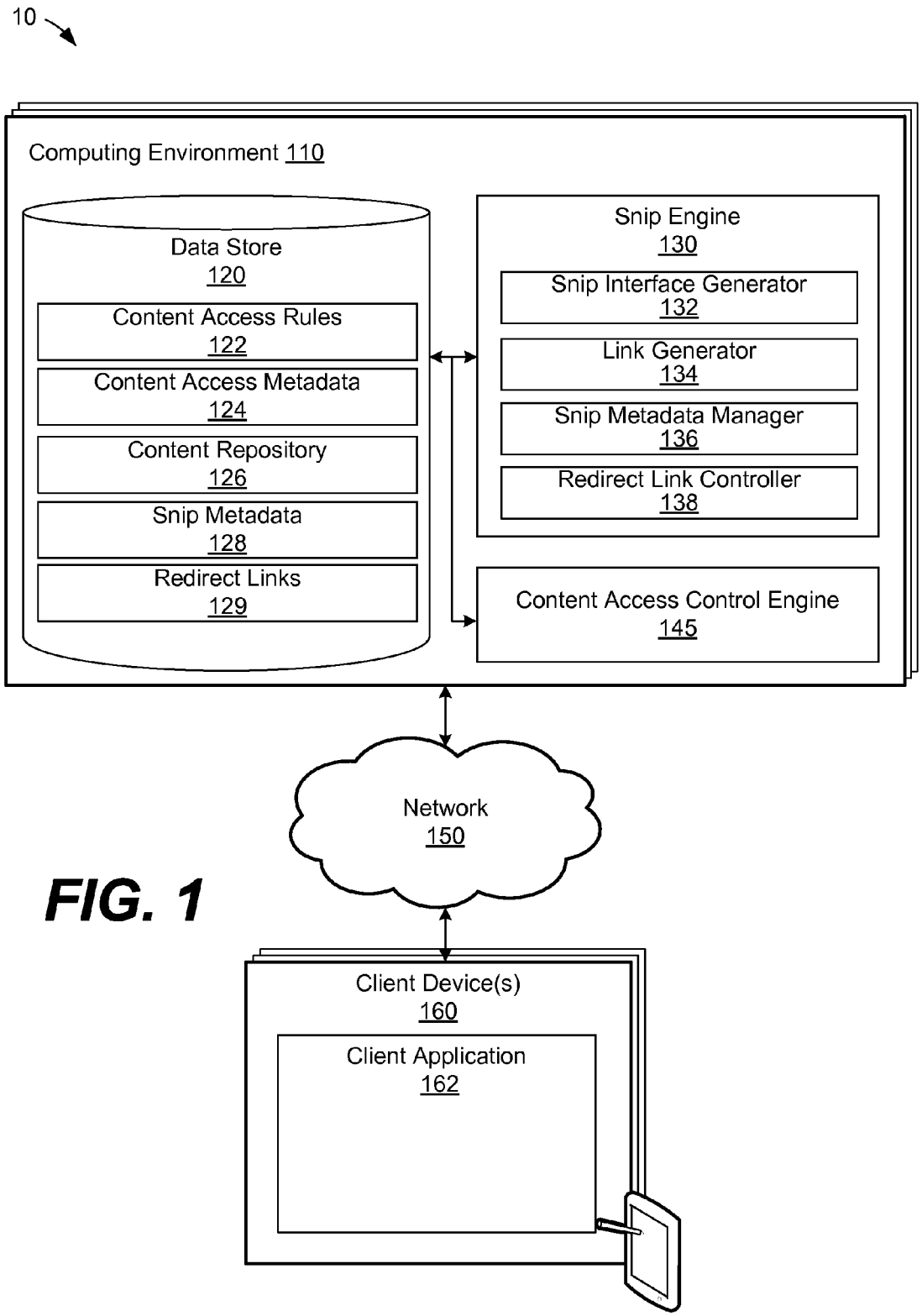
FIG. 1 illustrates an example diagram of a networked computing environment for content snip capture and sharing.

FIG. 1 illustrates an example diagram of a networked computing environment 10 for content snip capture and sharing. The networked environment 10 includes a computing environment 110, a network 150, and a client device 160. The computing environment 110 can be embodied as a computer, computing device, or computing system. In certain embodiments, the computing environment 110 can include one or more computing devices arranged, for example, in one or more server or computer banks. The computing device or devices can be located at a single installation site or distributed among different geographical locations. As further described below, the computing environment 110 can include a plurality of computing devices that together embody a hosted computing resource, a grid computing resource, or other distributed computing arrangement. In some cases, the computing environment 110 can be embodied as an elastic computing resource where an allotted capacity of processing, network, storage, or other computing-related resources varies over time. The computing environment 110 can also include or correspond to one or more virtualized server instances that are created in order to execute the functionality described herein.

The computing environment 110 can also be embodied, in part, as various functional (e.g., computer-readable instruction), logic (e.g., device, circuit, or processing circuit), or functional and logic elements that can be executed by the computing environment 110 to direct the computing environment 110 to perform aspects of the examples described herein. According to examples of content snip capture and sharing described herein, the computing environment 110 can store data files, generate and store content access rules and content access metadata associated with the data files, generate and store snip metadata, provide authenticated or controlled access to the data files, and generate and manage links to snips of content.

The network 150 can include the Internet, intranets, extranets, wide area networks (WANs), local area networks (LANs), wired networks, wireless networks, cable networks, satellite networks, other suitable networks, or any combinations thereof. The computing environment 110 can communicate with other devices coupled to the network 150 using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof. The network 150 can include connections to any number and type of network hosts or devices, such as website servers, file servers, cloud computing resources, databases, data stores, or any other network or computing architectures.

The client device 160 is representative of one or a plurality of client devices of one or more users. The client device 160 can be embodied as any computing device, processing circuit, or processor based device or system, including those embodied in the form of a desktop computer, a laptop computer, a personal digital assistant, a wearable computing device, a cellular telephone, a set-top box, a music or media player, or a tablet computer, among other example computing devices and systems. Depending upon its primary purpose or function, for example, the client device 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, sensors, or other input or communications devices. The peripheral devices can also include a display, indicator lights, speakers, global positioning system (GPS) circuitry, accelerometers, gyroscopes, or other peripheral devices, depending upon the primary purpose or function of the client device 160.

As illustrated in FIG. 1, the client device 160 can execute various applications, such as the client application 162, which is representative of one application that can be executed on the client device 160. In one embodiment, the client application 162 can be embodied as a standalone data file content viewer application that executes on the client device 160 to access data files stored on the computing environment 110 via the network 150. To this end, the client application 162 can be embodied as a document viewer or editor application, image viewer or editor application, media file viewer or editor application, or other application. The client application 162 can also be embodied as a hypertext-based communications application, such as Wget or cURL, or an internet browser, such as the Internet Explorer®, Firefox®, Chrome®, Safari®, or Silk® browsers, another type of browser or tool, or a variant thereof, without limitation.

Alternatively, the client application 162 can be embodied as a dedicated application or console, such as the Microsoft Outlook® e-mail client, that interacts with the computing environment 110 using a suitable protocol via the network 150. As another alternative, the client application 162 can be embodied as a messenger client or application, such as Microsoft Lync®, Short Messaging Service (SMS), Multimedia Messaging Service (MMS), or other application. Generally, when executed in the client device 160, the client application 162 can interpret and render a webpage, display content, or other user interface on a display of the client device 160. In the context of rendering and displaying content from data files, as further described below, any of the examples of the client application 162 (or variants thereof) can render and display the content on a display of the client device 160.

Next, before turning to a detailed description with reference to the remaining figures, a brief description of the operation of the computing environment 110 is provided. Among other elements, the computing environment 110 includes a data store 120, a snip engine 130, and a content access control engine 145. Among other types, categories, or partitions of data, the data store 120 stores content access rules 122, content access metadata 124, content or data files in the content repository 126, snip metadata 128, and redirect links 129. The snip engine 130 includes one or more logic elements, engines, or services that perform or embody various aspects of the features described herein, including a snip interface generator 132, a link generator 134, snip metadata manager 136, and a redirect link controller 138.

In the data store 120, the content access rules 122 include various access rules associated with individual users, groups of users, or both individual users and groups of users. As one example, an access rule can specify that an individual is or is not permitted to access a partition or drive where content or data files are stored. As another example, an access rule can specify that access to a partition or drive is or is not permitted by a computing device based on one or more operating parameters of the computing device. In addition to the access rules defined in the content access rules 122, the content access metadata 124 defines various conditions or parameters associated with access to the content or data files stored in the content repository 126. The conditions or parameters can specify, for example, that one or more ranges of content in a content file are accessible under certain conditions but not others. The conditions or parameters can also specify that the ranges are accessible to an individual or group of individuals but are not inaccessible to another individual or group of individuals.

The content repository 126 stores content or data files, such as text, document, publishing, financial, geographic information system, graphics, presentation, script, spreadsheet, webpage, image, media, backup, archive, database, compressed and uncompressed disk, computer aided design, design automation, and other types of data files, in any suitable file format, without limitation. The content repository 126 stores the content or data files and, based on the access control provided by the content access control engine 145, provides access to the content or data files by users of various computing devices, such as the client device 160, over the network 150. In some cases, the content repository 126 or at least a portion of the content repository 126 can be hosted by a computing environment external to the computing environment 110 and accessed through the network 150.

The snip metadata 128 includes metadata associated with links to snips of content generated by the snip engine 130. For example, after a snip to a portion of a content file is identified by a user, the user has the option to embed annotations or other information related to the snip. The purpose and use of the snip metadata 128 are described in further detail below.

The redirect links 129 include intermediary links to content or data files stored in the content repository 126. In some cases, the snip engine 130 can generate both a link to a content file stored in the content repository 126 and a redirect link to the content file, where the link to the content file is directed to the redirect link and the redirect link is directed to the content file stored in the content repository 126. Using redirect links, the redirect link controller 138 can break a link to a content file based on one or more conditions, parameters, or rules. The purpose and use of the redirect links 129 are described in further detail below.

Turning to a brief description of the operation of the snip engine 130, it is noted that the snip engine 130 conducts two main services, including the generation of links to content files and the maintenance of the links. As for the generation of links, when a content or data file stored in the content repository 126 is accessed by the client device 160 over the network 150, the snip interface generator 132 can generate a user interface for generating a link to a snip of the content. In that context, a snip can be embodied as any portion or range of a content or data file, such as one or more pages or paragraphs in a document file, one or more time ranges of video or audio in a media file, or one or more ranges of data in a data file, among other example portions. The user interface can be provided on a display of the client device 160, for example. To generate the user interface, the snip interface generator 132 can generate one or more network pages for rendering and display on the client application 162 of the client device 160. Alternatively, the client application 162 can operate as a standalone application that displays the user interface at the direction of the snip interface generator 132.

The link generator 134 can generate a link to a content file based on input gathered through the user interface. For example, the link generator 134 can receive an identifier of one or more recipients for the link. Additionally, the link generator 134 can gather a snip or time range of the content file, other link parameters, snip annotations, link access rules, or other parameters associated with the generation of a link.

When the recipient of a link to a content file is identified, the snip interface generator 132 can verify which portions or ranges, if any, of the content file are accessible to the recipient. Thus, if a user wishes to share a range of a content file to a recipient using a link to (or a copy of) the range of content, the snip engine 130 assists the user by first identifying whether the recipient is authorized to access the range of the content file. For example, to identify one or more ranges of a content file that are accessible to a recipient, the snip interface engine 132 can parse the content access metadata 124 for the content file to identify ranges of the content file that are access controlled. The snip interface engine 132 can then determine which of the ranges are accessible to the recipient based on an application of the content access rules 122 for the recipient to the ranges. For example, the content access metadata 124 can designate a first range of a content file as being inaccessible to a group of employees and a second range of the content file as being accessible to the group. Further, the content access rules 122 can designate a certain recipient as being part of the group of employees. In this case, the snip interface engine 132 would identify the second range of the content file as being accessible to the recipient and the first range as inaccessible.

After one or more accessible ranges, inaccessible ranges, or both accessible and inaccessible ranges of a content file are identified, the snip interface engine 132 can present an indicator of the accessible ranges in the user interface for generating the link to the content file. Similarly, the snip interface engine 132 can present an indicator of the inaccessible ranges in the user interface. In that way, if a recipient of a link is not authorized to access certain ranges of the content file, then the user interface provides a notification that the intended recipient is not authorized to access the ranges of it. For example, as described below with reference to FIG. 3, the snip interface generator 132 can cross out, black out, or colorize ranges in a progress bar for the content file as being unavailable for sharing if the intended recipient is not authorized to access those ranges. On the other hand, if the recipient is authorized to access one or more ranges of the content file, then the user interface permits the selection of one or more snips of the content file in those authorized ranges. In this case, the snip interface generator 132 can colorize those authorized ranges in the progress bar as being available for sharing.

Through the user interface, the link generator 134 can identify a selection of one or more snips or ranges of the content file selected by a user for sharing to a recipient. Each snip or range can be identified by a start time and an end time. In turn, the link generator 134 can generate the link to the content file, where the link includes at least one argument that specifies start times and end times of the one or more snips selected by the user for sharing to the recipient. The snip engine 130 can then forward the link to the recipient through an e-mail, messaging, or other service.

The snip metadata manager 136 can gather metadata associated with links to content generated by the link generator 134. For example, a user can provide annotation data, such as text commentary, associated with a snip of a content file. This annotation data can be stored in the snip metadata 128 for reference when the snip of the content file is accessed using the link. Further the link can include an argument that specifies whether annotation data is available or whether the annotation data should be displayed along with the snip of the content file when accessed. Finally, using redirect links generated by the link generator 134, the redirect link controller 138 can break a link to a content file based on one or more conditions, parameters, or rules. The operation of the redirect link controller 138 is described in greater detail below.

Among other factors, the content access control engine 145 can permit or deny access to one or more data files stored in the content repository 126 depending upon who is seeking to access the data files, what portion of the data files access is being sought to, and the manner in which access is being sought. For example, when a user of the client device 160 seeks access to a content file stored in the content repository 126 using a link generated by the snip engine 130, the content access control engine 145 first identifies and authenticates the user using facial recognition, a login name and password, a pin number, a hardware or software key or certificate, or another authentication mechanism. Once the user of the client device 160 is identified, the content access control engine 145 can reference the access rules stored in the content access rules 122 and the access parameters or conditions stored in the content access metadata 124 to determine whether the user of the client device 160 is authorized to access the content file or snip of the content file requested by the user. Thus, the computing environment 110 permits or denies access to content files stored in the content repository 126, for example, based on the authentication and identification of users and the associated rules and conditions for access. Further, the client application 162 can operate according to the access rules and conditions described above. In that context, the client application 162 can be considered a restricted access application because it maintains or restricts the scope of a user's access to content depending upon who is seeking to access the content, among other access rules and conditions.

Before turning to the process flow diagrams, it is noted that, through the client application 162, the client device 160 can incorporate the logic, perform the functions, or incorporate the logic and perform the functions described with reference to the snip engine 130. In other words, while the process flow diagrams are generally described as being performed by the snip engine 130 in the computing environment 110, the concepts described herein extend to those features being incorporated and performed in standalone devices, such as in the client device 160.

Figure 2:
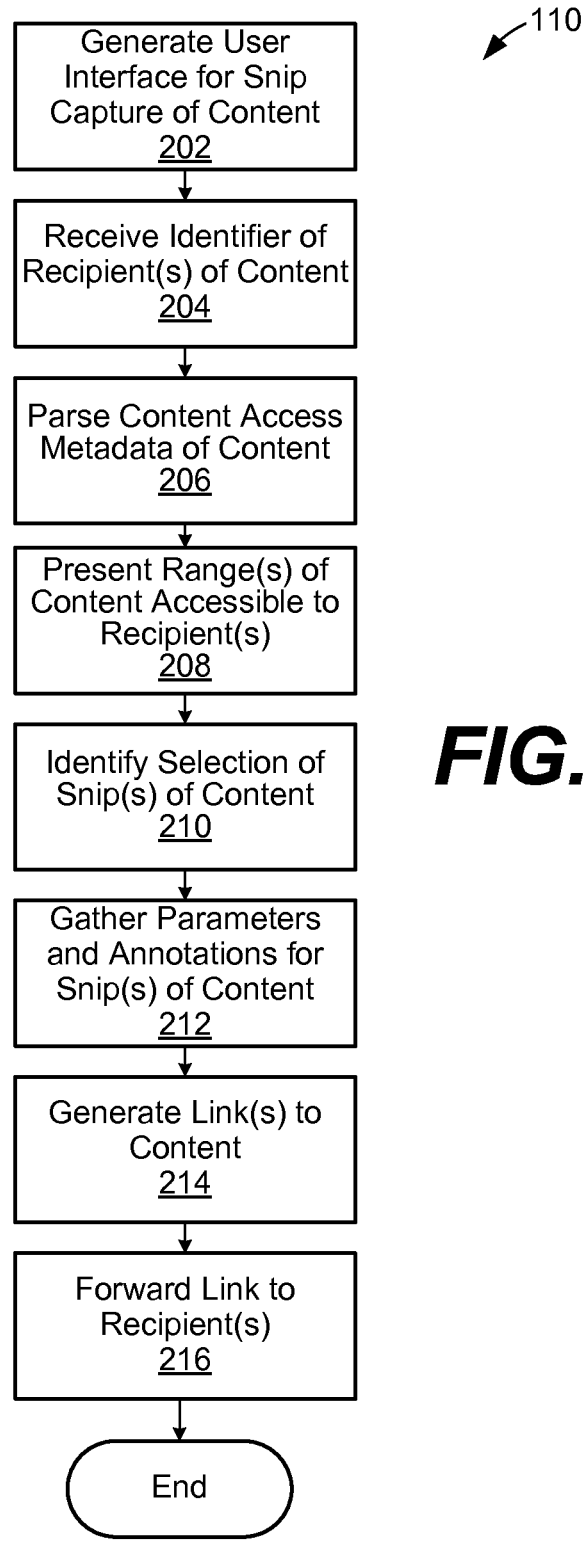
FIG. 2 illustrates a process for content snip capture and link forwarding according to various examples described herein.

Turning now to more detailed examples of the operation of the computing environment 110, FIG. 2 illustrates a process for content snip capture and link forwarding according to various examples described herein. Although the process is described below as being performed by the computing environment 110 in FIG. 1, the process can be performed by other, similarly configured computing devices or systems. Additionally, although the process is described below for snip capture and sharing from one file stored in the content repository 126, it is noted that the process can be performed using any files stored in the content repository 126 or other locations.

At step 202, the process includes generating a user interface for snip capture and link forwarding. For example, the snip interface generator 132 can generate a user interface for generating a link to a snip of content on a display of the client device 160. The generation of the user interface can be prompted when a user of the client device 160 opens a content file stored in the content repository 126 and selects a menu or other user interface option to send a link, for example, for sharing one or more portions of a content file to certain recipients. To generate the user interface 300, the snip interface generator 132 can generate one or more network pages for rendering and display on the client application 162 of the client device 160. Alternatively, the client application 162 can operate as a standalone application that displays the user interface at the direction of the snip interface generator 132.

Figure 3:
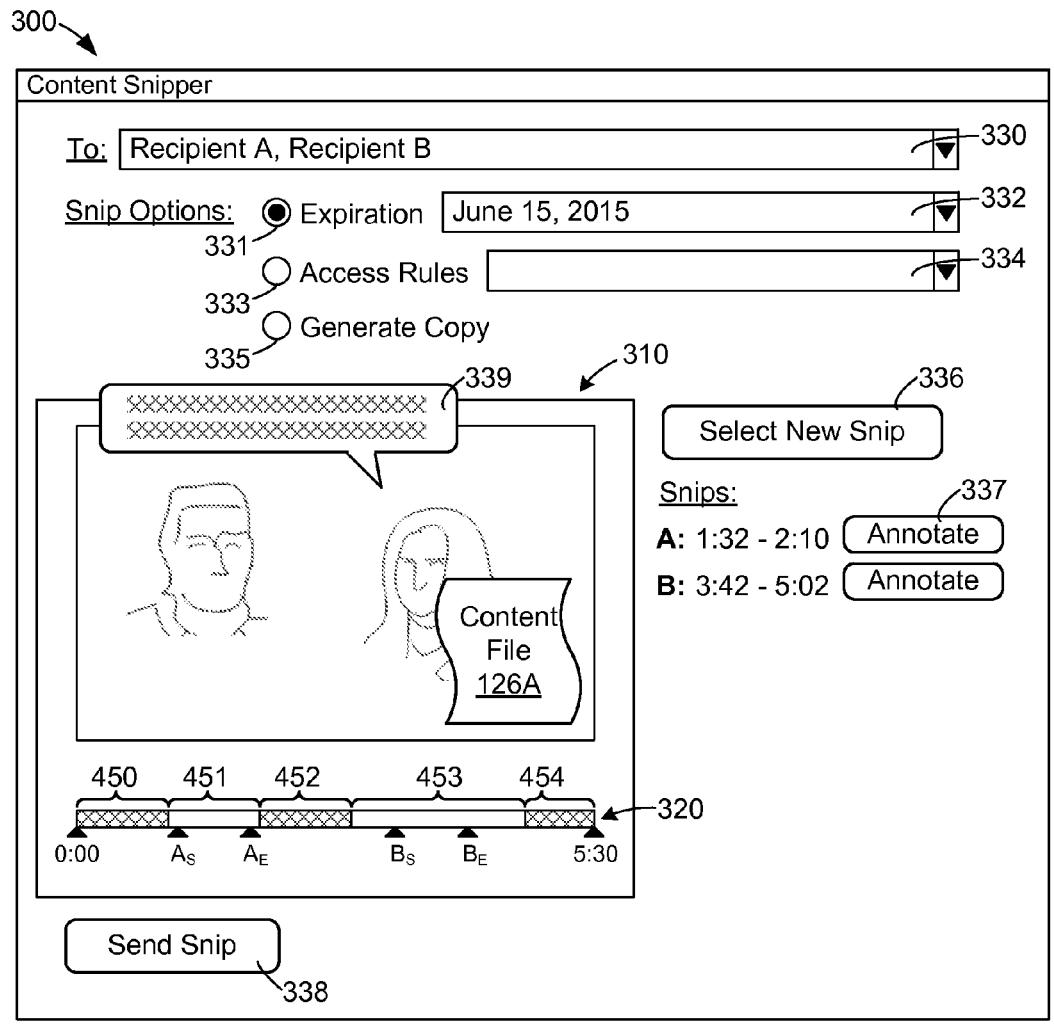
FIG. 3 illustrates a content snipper interface for generating a link to a snip of content according to various examples described herein.

Referring to FIG. 3 for an example user interface, content snipper user interface 300 is illustrated. The content snipper user interface 300 includes a content window 310 in which a content file 126A from the content repository 126 can be viewed, edited, or both viewed and edited. In the example user interface 300, video content file 126A is being viewed in the content window 310, although it should be appreciated that the user interface 300 can be used to capture and forward links to snips of other types of content, such as audio, text, and other types of data. The content window 310 includes a media progress bar 320. As shown in the media progress bar 310, the video content in the content file 126A spans from time 0:00 to 5:30.

The user interface 300 also includes user interface elements 330-338. More specifically, among other user interface elements which can be used in the user interface 300, the user interface 300 includes a recipient entry field 330, an expiration option button 331 and time entry field 332, an access rule option button 333 and rule entry field 334, a generate copy option button 335, a select new snip button 336, an annotate button 337 associated with a snip, and a send snip button 338. The user interface elements 330-338 shown in FIG. 3 are provided by way of example and are not intended to be limiting of the types of user interfaces that can be relied upon in the user interface 300. The purpose and use of the user interface elements 330-338, individually, are described in further detail below. Generally, the user interface 300 can be relied upon to permit a user of the client device 160 to send a link to (or copy of) a portion or snip of a content file to one or more recipients, as described below.

At step 204, the process in FIG. 2 includes receiving an identifier of a recipient for a link to a content file. For example, through the recipient entry field 330 in the user interface 300, the link generator 134 can receive identifiers of one or more recipients for a link to the content file displayed in the content window 310. Each recipient can be specified using any suitable identifier, such as an enterprise system username, e-mail address, or other tag or identifier. Similarly, groups of recipients can be specified using a group name. If multiple recipients are entered, individual recipients can be delimited by commas or semicolons when entered in the recipient entry field 330. The recipient entry field 330 can, in some cases, limit the entry of recipients to those which the user of the client device 160, for example, is permitted to share links to content with. In the example shown in FIG. 3, Recipient A and Recipient B are entered by a user into the recipient entry field 330.

At step 206, the process includes parsing content access metadata to identify at least one range of content accessible to the recipient or recipients identified at step 204. For example, as shown in FIG. 3, the snip interface generator 132 can parse the content access metadata of the content file 126A being viewed in the content window 310 to identify one or more ranges of the content file 126A accessible to Recipient A and Recipient B.

Figure 4:
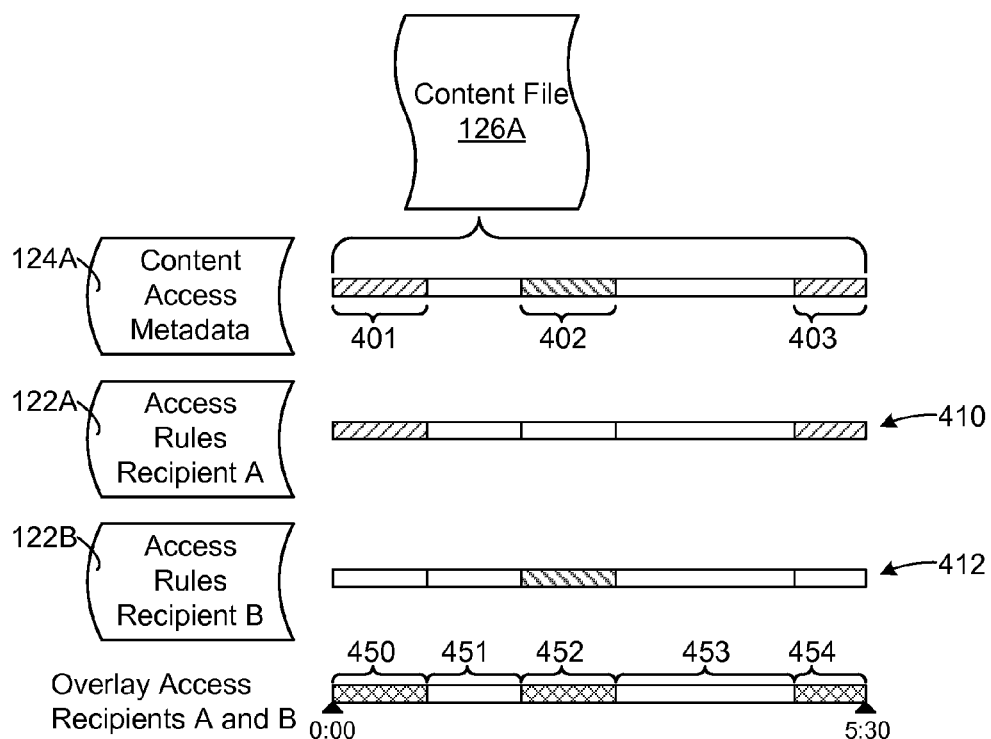
FIG. 4 illustrates ranges of a content file accessible to different recipients according to various examples described herein.

Referring to FIG. 4 for a more detailed example of how step 206 is performed, the content file 126A, content access metadata 124A for the content file 126A, and content access rules 122A and 122B for Recipient A and Recipient B, respectively, are illustrated. The content access metadata 124A is representative of metadata associated with the content file 126A and is stored in the content access metadata 124. The content access rules 122A and 122B are representative of access rules for Recipient A and Recipient B, respectively, and are stored in the content access rules 122.

To identify ranges of the content file 126A that are accessible to both Recipient A and Recipient B at step 206, the snip interface engine 132 can parse the content access metadata 124A to identify any ranges of the content file 126A that are access controlled for at least one group or class of individuals or users. In the example shown in FIG. 4, the content access metadata 124A specifies that ranges 401-403 are access controlled in the content file 126A. More specifically, the content access metadata 124A specifies that the ranges 401 and 403 are access controlled for a first class or group of individuals and that the range 402 is access controlled for a second class or group of individuals. The content access metadata 124A does not specify that the other portions or ranges of the content file 126A are access controlled.

The snip interface engine 132 can then determine which of the ranges 401-403 are accessible to Recipient A based on an application of the content access rules 122A for Recipient A to the access control conditions for ranges 401-403. The snip interface engine 132 can also determine which of the ranges 401-403 are accessible to Recipient B based on an application of the content access rules 122B for Recipient B to the access control conditions for ranges 401-403. As shown in the example media progress bar 410 in FIG. 4, the content access rules 122A indicate that Recipient A is a member of the class of individuals for which access is denied for ranges 401 and 403 but not a member of the class for which access is denied for the range 402. Thus, the ranges 401 and 403 are identified as being inaccessible to Recipient A. Similarly, as shown in the example media progress bar 412, the content access rules 122B indicate that Recipient B is a member of the class of individuals for which access is denied for range 402 but for ranges 401 and 403. Thus, the range 402 is identified as being inaccessible to Recipient B.

It is noted that the content access metadata 124A and the content access rules 122A and 122B can be structured to specify access exclusions (e.g., a blacklist), access inclusions (e.g., a whitelist), or any combination thereof for ranges of content, individual users, and groups of users. Further, accessible ranges and access rules for files stored in the content repository 126 can be combined into a single metadata or rule database for one or more individuals or users. Overlaying the media progress bars 410 and 412 for Recipients A and B, respectively, upon each other, it is clear how the snip interface generator 132 identifies that the ranges 451 and 453 of the content file 126A are accessible to both Recipients A and B, while ranges 450, 452, and 454 are inaccessible.

Referring back to FIG. 2, once the accessible ranges for Recipient A and Recipient B are identified at step 206, the process includes presenting one or more indicators of the accessible ranges at step 208. For example, as shown in FIG. 3, the snip interface generator 132 can cross or black out the ranges 450, 452, and 454, but not cross out the ranges 451 and 453 in the media progress bar 320. In other words, the snip interface generator 132 can present an indicator of overlap between the ranges of the content file 126A accessible to Recipient A and the ranges accessible to Recipient B.

At step 210, the process includes identifying a selection of one or more snips of the content file 126A accessible to Recipient A and Recipient B. In the user interface 300 shown in FIG. 3, a user can identify a portion or snip of one or both of the ranges 451 and 453 by using the select new snip button 336 and then positioning (e.g., dragging) the start and end pointers $A_S$ and $A_E$, respectively, to start and end positions of the snip. In the user interface 3000, the snips "A" and "B" have been identified, with the snip "A" ranging from time 1:32 to 2:10 and the snip "B" ranging from time 3:42 to 5:02. Based on the positions of the start and end pointers $A_S$ and $A_E$ and $B_S$ and $B_E$, the link generator 134 can identify the selection of the ranges of the snips "A" and "B". Here, it is noted that, although start and end pointers are shown in FIG. 3, other mechanisms for selecting and identifying ranges of content can be used.

It should be appreciated that the user interface 300 can prevent the selection of any snips which overlap with the ranges 450, 452, and 454 of the content file 126A, because those ranges are not accessible to at least one of Recipient A or Recipient B. In other words, even if the user interface 300 were to permit the selection of a snip that overlapped with the range 450, once a link to that snip was sent to Recipient A and Recipient B, at least one of them would be unable to access the snip. This is because the content control access engine 145 would prevent the access based on the associated content access rules 122 and the content access metadata 124. In this context, it can also be appreciated that the user interface 300 is capable of dynamically indicating the ranges of content available for sending a link based on which recipients are identified in the recipient entry field 330.

At step 212, the process includes gathering any parameters and annotations for the snips identified at step 210. For example, based on the use of the expiration option button 331 and time entry field 332, the access rule option button 333 and rule entry field 334, the generate copy option button 335, and any other user interface elements in the user interface 300, the link generator 134 can identify and gather any parameters relevant to the snips identified at step 210. These parameters can be used to tailor certain arguments in any links generated at step 214. Similarly, based on the use of the annotate button 337, the snip metadata manager 136 can identify and gather annotation data and store it as the snip metadata 128.

In the user interface 300, the expiration option button 331 can be used to specify that any link generated expires on the day, time, or day and time in the time entry field 332. The access rule option button 333 can be used to specify that one or more access control rules in the rule entry field 334 apply to any link generated. The access control rules in the rule entry field 334 may be in extension to any of those already defined in the content access rules 122 and the content access metadata 124. The generate copy option button 335 can be used to specify that any link, when used, returns a copy of the snip of the content file specified in the link rather than merely accessing the snip through the link. The annotate button 337, being associated with the snip "A" in FIG. 3, can be used to enter annotation text or other data to associate with the snip "A". For example, once the annotate button 337 is used, an annotation balloon 339 or other interface option can appear in which annotation data associated with the snip "A" can be entered by a user. In turn, the snip metadata manager 136 can collect this annotation data and save it as the snip metadata 128 for reproduction when the snip "A" is accessed using the associated link.

At step 214, the process includes generating a link to the content file 126A. For example, after all options and selections are made using the user interface 300, the link generator 134 can generate a link to the snips "A" and "B" of the content file 126A. The link can include one or more arguments that identify the start and end times of each of the snips "A" and "B" identified at step 210, along with additional arguments based on the parameters gathered at step 212. It is noted that the link generated at step 214 links to one or more portions or snips of the content 126A, rather than merely referencing the content 126A in its entirety. In that sense, the link can be relied upon to share one or more selected snips of the content 126A with one or more recipients. Using the link generated at step 214, it is not necessary for a recipient to review the entire content file 126A when only certain portions of it are relevant.

Figure 5:
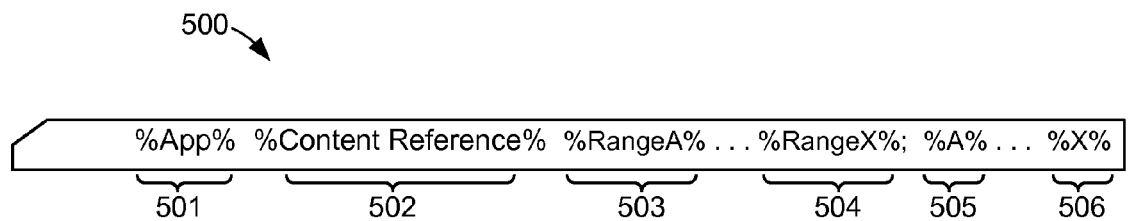
FIG. 5 illustrates a link to a content file and arguments to the link according to various examples described herein.

As one example of a link generated at step 214, FIG. 5 illustrates link 500. The link 500 includes an application descriptor 501, a content reference 502, snip ranges 503 and 504, and arguments 505 and 506. Because the link 500 is provided as one example, it should be appreciated that certain fields or arguments shown in the link 500 can be omitted in other links and that additional fields or arguments can be included in other links.

The application descriptor 501 can specify that a certain application or program should be invoked to open the content identified by the content reference 502. For example, if the content reference 502 references the video content file 126A stored in the content repository 126, the application descriptor 501 can specify that a certain video viewer application should be invoked to open the video content file 126A. The specified application can be a managed or unmanaged application and can incorporate aspects of restricted access as described herein.

The content reference 502 references the content file 126A stored in the content access metadata 124. The ranges 503 and 504 specify the start and end times for the snip or snips of the content file 126A identified at step 210. For example, the ranges 503 and 504 can specify the snips "A" 451 and "B" 453 of the content file 126A as ranging from time 1:32 to 2:10 and from time 3:42 to 5:02, respectively. The arguments 505 and 506 specify arguments based on the parameters gathered at step 212. For example, the arguments 505 and 506 can include a copy snip argument that results in a copy of a snip being generated and transferred upon use of the link 500, an access rule argument that specifies the evaluation of an access rule upon use of the link 500, or an expiration argument that specifies evaluation of a link expiration time upon use of the link 500.

Figure 6:
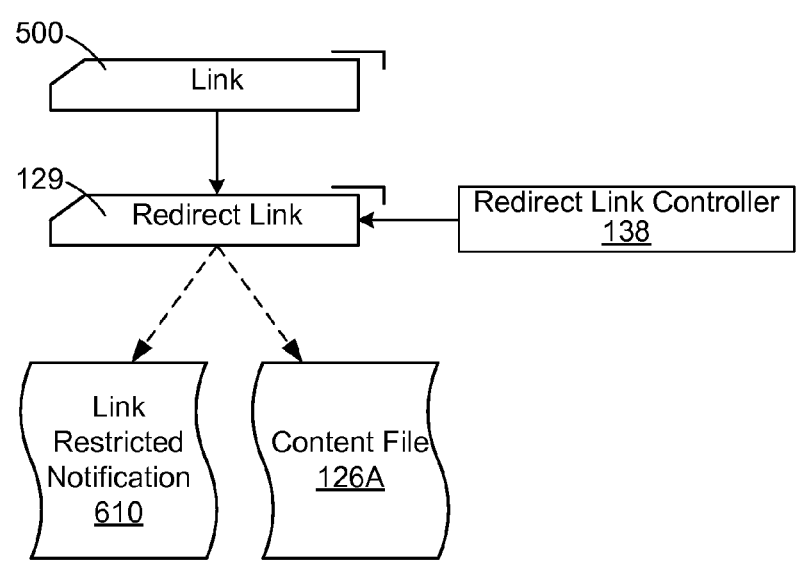
FIG. 6 illustrates a representative diagram of a redirect link and redirect link control according to various examples described herein.

At step 214, the process can also include generating a redirect link. In this context, FIG. 6 illustrates a representative diagram of a redirect link 129 and redirect link control according to various examples described herein. The link generator 134 can generate the redirect link 129 in addition to the link 500, for example, as an intermediary link to the content file 126A. Any redirect links generated by the link generator 134 can be stored in the data store 120, as described above.

If the redirect link 129 is generated by the link generator 134, then the link 500 can be directed to the redirect link 129, and the redirect link 129 can be directed to the content file 126A, for example, or another location based on the redirect link controller 138. More specifically, when the redirect link 129 is used as an intermediary link to the content file 126A, the redirect link 129 can be modified over time to point to either the content file 126A or a link restricted notification 610, for example. The link restricted notification 610 can indicate that the link 500 has expired or is no longer valid, for example, among other notifications.

Over time, the redirect link controller 138 can monitor for expiration of links, changed or modified access control rules content files or individuals, changes to content access policies, or other changes in the computing environment 110. If the changes warrant redirection of the link 500 (or any other link), then the redirect link controller 138 can update the redirect link 129 (or other redirect links) to point to the link restricted notification 610. Thus, redirect links can be used to provide an additional level of control beyond that provided by the content access control engine 138. It is also noted that a redirect link can be used in place of one or more parameters in the link 500. For example, rather than explicitly specifying an expiration argument in the link 500, the redirect link controller 138 can control expiration of links by redirection.

Referring back to FIG. 2, at step 216, the process includes forwarding the link generated at step 216 to the recipient or recipients in the recipient entry field 330. In other words, at step 216, the link generator 134 or other application can forward the link generated at step 216 through an e-mail, messaging, or other service to Recipient A and Recipient B. Once the link is received, the link can be used to access (or receive a copy of) the snips referenced in the link.

Figure 7:
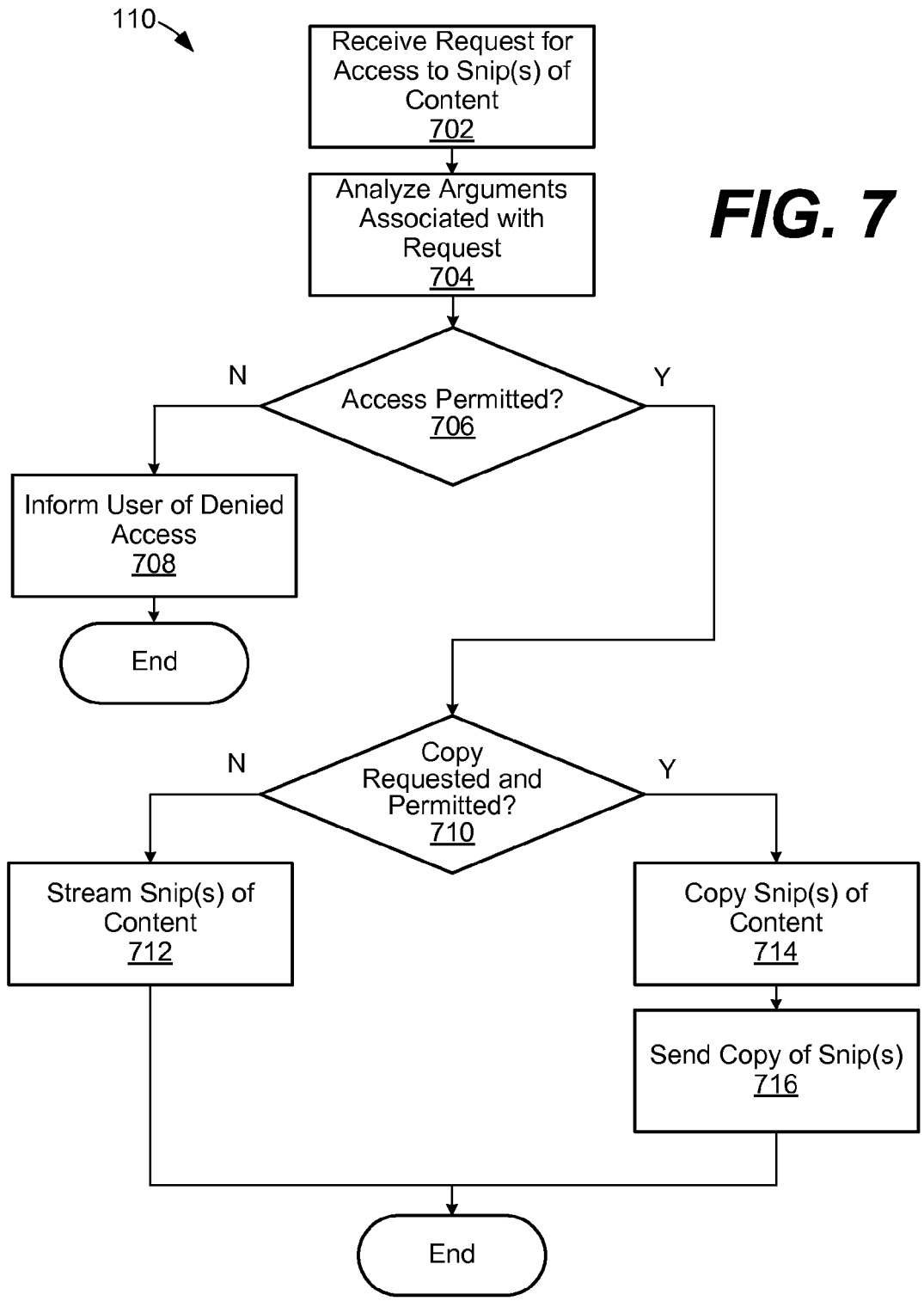
FIG. 7 illustrates a process for content snip sharing according to various examples described herein.

FIG. 7 illustrates a process for content snip sharing according to various examples described herein. The process is directed to the steps performed by the computing environment 110 when a link for content snip sharing is used. At step 702, the process includes receiving a request for access to content. For example, when a user of the client device 160 uses or follows a link, such as the link 500, the content access control engine 145 can receive the content reference 502 as a link to a content file in the content repository 126. In one example case, when a user of the client device 160 uses the link 500, the client device 160 can launch an application according to the application descriptor 501 in the link 500, and the application can request the content identified in the content reference 502 from the computing environment 110 based on the fields in the link 500. At step 702, the process can also include receiving any arguments in the link 500, such as the snip ranges 503 and 504 and the arguments 505 and 506, for example. It is noted that, if the redirect link 129 is used as an intermediary link and is redirected to the link restricted notification 610, as described above, the computing environment 110 will not receive any request even after the user of the client device 160 uses the link 500. Instead, the user will be directed to the notice in the link restricted notification 610.

At step 704, the process includes analyzing any arguments received at step 702, such as the snip ranges 503 and 504 and the arguments 505 and 506, for example. Here, the content access control engine 145, the snip engine 130, or both can analyze any arguments received with the request for content at step 702. For example, the content access control engine 145 can analyze whether the user of the client device 160 is authorized to access the content file identified by the content reference 502 based on the snip range arguments 503 and 504. In that regard, the content access control engine 145 can reference the content access rules 122 and the content access metadata 124 to determine whether the user of the client device 160 is permitted to access the snip ranges 451 and 453 of the content file 126A, because the snip range arguments 503 and 504 identify the snip ranges 451 and 453 and the content reference 502 identifies the content file 126A. If a copy snip argument is received, the content access control engine 145 can determine whether the control rules permit the generation of a copy of the snip ranges 451 and 453 for the user of the client device 160. The content access control engine 145, the snip engine 130, or both can also determine whether the link 500 is expired, for example, or subject to other access rule arguments defined in the link 500.

At step 706, if the analysis at step 704 concludes that the user of the client device 160 is not permitted to access the content file 126A over the snip ranges 451 and 453, then the process proceeds to step 708. Similarly, at step 706, if the analysis at step 704 concludes that the user is not permitted access because of expiration of the link 500, failure to adhere to some access rule, or for any other reason, then the process proceeds to step 708. At step 708, the process includes informing the user of the client device 160 that access to content using the link 500 has been denied. Otherwise, at step 706, if the analysis at step 704 concludes that the user of the client device 160 is permitted access, the process proceeds to step 710.

From step 710, if the analysis at step 704 concludes that the generation of a copy is not requested, then the process proceeds to step 712. At step 712, the content access control engine 145 accesses the snip ranges 451 and 453 of the content file 126A and streams or shares them to the associated application on the client device 160. If available, the snip metadata manager 136 can also transfer any annotation data that is stored in the snip metadata for the snip ranges 451 and 453 to the client device 160. This annotation data can then be presented on a display of the client device 160 along with the snip ranges 451 and 453.

From step 710, if the analysis at step 704 concludes that the generation of a copy of the snip ranges 451 and 453 is requested and permitted, then the process proceeds to step 714. At step 714, the content access control engine 145 can copy the snip ranges 451 and 453 of the content file 126A. At step 716, the content access control engine 145 sends the snip ranges 451 and 453 to the client device 160.

The flowcharts of FIGS. 2 and 7 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 160, computing environment 110, and other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the snip engine 130, the content access control engine 145, and/or other components can be stored in one or more storage devices and be executable by one or more processors. Also, a data store, such as the data store 120 can be stored in the one or more storage devices.

The snip engine 130, the content access control engine 145, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the snip engine 130, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 110. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device, the program code being configured to cause the at least one computing device to at least:
   receive, through a user interface, an identifier of a recipient for a link to a content file;
   parse content access metadata of the content file to identify at least one accessible range of the content file for the recipient and at least one inaccessible range of the content for the recipient based on content access rules for the recipient;
   present, in the user interface, an indicator of the at least one accessible range of the content file for the recipient and an indicator of the at least one inaccessible range of the content file for the recipient;
   identify, through the user interface, a selection of a snip of the at least one accessible range of the content file for the recipient;

generate the link to the content file, the link comprising at least one argument that specifies a start and an end of the snip of the content file; and forward the link to the recipient.

2. The non-transitory computer-readable medium according to claim 1, the program code being further configured to cause the at least one computing device to at least:

receive, through the user interface, an identifier of a second recipient for the link to the content file;

parse the content access metadata of the content file to identify at least one accessible range of the content file for the second recipient based on content access rules for the second recipient; and present, in the user interface, an indicator of overlap between the at least one accessible range of the content file for the recipient and the at least one accessible range of the content file for the second recipient.

3. The non-transitory computer-readable medium according to claim 1, the program code being further configured to cause the at least one computing device to at least:

receive, through the user interface, annotation data for the snip of the content file; and generate snip metadata for the content file, the snip metadata including the annotation data for the snip of the content file.

4. The non-transitory computer-readable medium according to claim 1, the program code being further configured to cause the at least one computing device to at least:

generate a redirect link as an intermediary link to the content file, wherein the link to the content file is directed to the redirect link and the redirect link is directed to at least one of the content file or a link restriction notice.

5. The non-transitory computer-readable medium according to claim 4, the program code being further configured to cause the at least one computing device to at least:

monitor an expiration condition associated with the link to the content file; and in response to the expiration condition being satisfied, update the redirect link to be directed to the link restriction notice.

6. The non-transitory computer-readable medium according to claim 4, the program code being further configured to cause the at least one computing device to at least:

monitor the content access metadata of the content file; and in response to a change in access rights in the content access metadata, update the redirect link to be directed to the link restriction notice.

7. The non-transitory computer-readable medium according to claim 1, the program code being further configured to cause the at least one computing device to at least:

gather at least one parameter to be attributed to the link, wherein the link further comprises at least one other argument based on the at least one parameter.

8. The non-transitory computer-readable medium according to claim 7, wherein the at least one other argument comprises at least one of a copy snip argument, an access rule argument, or an expiration argument.

9. A non-transitory computer-readable medium embodying program code executable in at least one computing device, the program code being configured to cause the at least one computing device to at least:

parse content access metadata of a content file to identify at least one accessible range of the content file for a recipient and at least one inaccessible range of the content for the recipient based on content access rules for the recipient;

present, in a user interface, an indicator of the at least one accessible range of the content file for the recipient and an indicator of the at least one inaccessible range of the content file for the recipient;

identify, through a user interface, a selection of a snip of the at least one accessible range of the content file for the recipient; and generate a link to the content file, the link comprising a snip start argument that specifies a start of the snip of the content file; and forward the link to the recipient.

10. The non-transitory computer-readable medium according to claim 9, wherein the link further comprises a snip end argument that specifies an end of the snip of the content file.

11. The non-transitory computer-readable medium according to claim 9, wherein the link further comprises at least one of a copy snip argument that specifies whether to forward a copy of the snip of the content file, an access rule argument associated with at least one access rule for the snip of the content file, or an expiration argument that specifies whether the link is expired.

12. The non-transitory computer-readable medium according to claim 9, the program code being further configured to cause the at least one computing device to at least:

receive, through the user interface, an identifier of a second recipient for the link to the content file;

parse the content access metadata of the content file to identify at least one accessible range of the content file for the second recipient; and present, in the user interface, an indicator of overlap between the at least one accessible range of the content file for the recipient and the at least one accessible range of the content file for the second recipient.

13. The non-transitory computer-readable medium according to claim 9, the program code being further configured to cause the at least one computing device to at least:

receive, through the user interface, annotation data for the snip of the content file; and generate snip metadata for the content file, the snip metadata including the annotation data for the snip of the content file.

14. The non-transitory computer-readable medium according to claim 9, the program code being further configured to cause the at least one computing device to at least:

receive a request for access to the snip of the content file from a client device, the request including at least one argument; and stream or copy the snip of the content file to the client device based on to the at least one argument.

15. A method, comprising:

receiving, with at least one computing device, an identifier of a recipient for a link to a content file;

presenting, with the at least one computing device, an indicator of at least one accessible range of the content file for the recipient and at least one inaccessible range of the content for the recipient based on content access rules for the recipient;

identifying, with the at least one computing device, a selection of a snip of the at least one accessible range of the content file for the recipient;

generating, with the at least one computing device, a link to the content file, the link comprising at least one argument associated with the snip of the content file; and forwarding, with the at least one computing device, the link to the recipient.

16. The method according to claim 15, further comprising:

receiving, with at least one computing device, a request for access to the snip of the content file from a client device, the request including at least one argument; and streaming or copying, with the at least one computing device, the snip of the content file to the client device based on to the at least one argument.

17. The method according to claim 15, further comprising parsing, with the at least one computing device, content access metadata of the content file to identify the at least one accessible range of the content file for the recipient and the at least one inaccessible range of the content for the recipient based on content access rules for the recipient.

18. The method according to claim 15, wherein the at least one argument comprises at least one of a snip start argument, a snip end argument, a copy snip argument, an access rule argument, or an expiration argument.

19. The method according to claim 15, further comprising:

receiving, with the at least one computing device, an identifier of a plurality of recipients for the link to the content file;

parsing, with the at least one computing device, content access metadata of the content file to identify at least one accessible range of the content file for each of the plurality of recipients based on content access rules for the plurality of recipients; and presenting, in a user interface, an indicator of the at least one accessible range of the content file for each of the plurality of recipients.

20. The method according to claim 15, further comprising:

receiving, with the at least one computing device, annotation data for the snip of the content file; and generating, with the at least one computing device, snip metadata, the snip metadata including the annotation data for the snip of the content file.

\* \* \* \* \*